United States Patent [19]

Kåhre

[11] Patent Number: 5,680,388
[45] Date of Patent: Oct. 21, 1997

[54] METHOD AND ARRANGEMENT FOR DYNAMIC ALLOCATION OF MULTIPLE CARRIER-WAVE CHANNELS FOR MULTIPLE ACCESS BY FREQUENCY DIVISION OF MULTIPLEXING

[75] Inventor: Ragnar Kåhre, Tallgatan, Sweden

[73] Assignee: Telia AB, Farsta, Sweden

[21] Appl. No.: 424,480

[22] PCT Filed: Nov. 9, 1993

[86] PCT No.: PCT/SE93/00941

§ 371 Date: May 12, 1995

§ 102(e) Date: May 12, 1995

[87] PCT Pub. No.: WO94/11961

PCT Pub. Date: May 26, 1994

[30] Foreign Application Priority Data

Nov. 13, 1992 [SE] Sweden ................... 9203384

[51] Int. Cl.⁶ ................... H04J 11/00; H04J 3/04; H04Q 7/00
[52] U.S. Cl. ................... 370/210; 370/208; 370/536; 370/329; 375/260
[58] Field of Search ................... 370/118, 19, 23, 370/49.5, 50, 70, 69.1, 203, 208, 210, 329, 431, 450, 536; 375/260; 455/59

[56] References Cited

U.S. PATENT DOCUMENTS

| 4,827,336 | 5/1989 | Acampora et al. | 358/135 |
|---|---|---|---|
| 5,115,309 | 5/1992 | Hang | 358/133 |
| 5,187,711 | 2/1993 | Hodohara | 455/59 |
| 5,274,627 | 12/1993 | De Santis | 370/49.5 |

OTHER PUBLICATIONS

EBU Review, Technical No. 224, Aug. 1987, pp. 47–68, M. Alard, et al., "Principles of Modulation and Channel Coding for Digital Broadcasting for Mobile Receivers".

EBU Review—Technical, No. 217, Jun. 1986, pp. 128–142, D. Pommier, et al., "Interleaving or Spectrum-Spreading in Digital Radio Intended for Vehicles".

Proceedings of the IEEE, vol. 68, No. 3, Mar. 1980, pp. 328–353, George L. Turin, "Intoduction to Spread-Spectrum Antimultipath Techniques and Their Application to Urban Digital Radio".

IEEE Transaction on Communication Technology, vol. COM-19, No. 5, Oct. 1971, pp. 628–634, S. B. Weinstein, et al., "Data Transmission by Frequency-Division Multiplexing Using the Discrete Fourier Transform".

IEEE Transactions on Communications, vol. COM-33, No. 7, Jul. 1985, pp. 665–675, Leonard J. Cimini, Jr., "Analysis and Simulation of a Digital Mobile Channel Using Orthogonal Frequency Division Multiplexing".

Patent Abstracts of Japan, vol. 7, No. 94 (E-171), JP-58-17743, Feb. 2, 1983.

*Primary Examiner*—Hassan Kizou
*Assistant Examiner*—A. Bnimoussa
*Attorney, Agent, or Firm*—Oblon, Spivak, McClelland, Maier & Neustadt, P.C.

[57] ABSTRACT

The invention relates to a method and an arrangement for dynamic allocation of multiple carrier wave channels for multiple access by frequency division multiplexing. the invention provides a number of mobile units with the possibility of flexible data speed and continuous transmission. On the fixed side, the number of transmitters and receivers can be minimized by utilizing broadband receivers which serve a number of mobiles. According to the invention, a wider frequency band is divided into a number of subbands with a modulated carrier wave in each subband. To vary the transmission speed, such a number of subbands is allocated as is needed by each user in order to cover the data clock requirement. Broadband transmitters/receivers handle the transmission over the entire accessible band. Oversampling is preferably carried out in the frequency demultiplexing in order to permit the best sampling time to be selected for the different frequency gaps (FIG. 2).

11 Claims, 3 Drawing Sheets

METHOD AND ARRANGEMENT FOR DYNAMIC ALLOCATION OF MULTIPLE CARRIER-WAVE CHANNELS FOR MULTIPLE ACCESS BY FREQUENCY DIVISION OF MULTIPLEXING

FIELD OF THE INVENTION

The present invention relates to a method for dynamic allocation of multiple carrier-wave channels for multiple access by frequency division multiplexing and transmitter arrangements and receiver arrangements for carrying out the method. The invention is especially intended to be applied to mobile telecommunication systems. The invention provides a number of mobile units with the possibility for flexible data speed and continuous transmission. On the fixed side, the number of transmitters and receivers can be minimized by utilizing broadband receivers which serve several mobile units.

PRIOR ART

In mobile telecommunication systems, it is generally desirable to be able to provide a variable transmission speed in the different connections in order to be able to utilize the accessible frequency band as effectively as possible. In general, the system is provided with a frequency band with fixed width at a certain frequency.

There are a number of known ways to control the utilization of the frequency band, for example TDMA, FDMA, CDMA and hybrids of these.

Time division multiple access (TDMA) involves transmitting and receiving being divided into time gaps. Each channel has its predetermined time gap and the transmission speed can be varied by changing the length of the time gap. A disadvantage is that the system only uses one frequency at a time. TDMA is also sensitive to time dispersion due to the high channel data speed.

Frequency division multiple access (FDMA) involves the frequency band being divided into frequency bands with one transmitter/receiver in each narrow band with a carrier wave in the centre of the frequency bands. If it is attempted to increase the data speed by widening the carrier wave, interference is produced in adjacent frequency bands, which is naturally a disadvantage. Moreover, it is uneconomical to have one transmitter for each frequency bands, which makes for a large number of transmitters.

Code division multiple access (CDMA) involves all channels using the same frequency band but being distinguished by each mobile unit having its own unique code key with which the data sequence is coded. CDMA gives rise to very complex receivers and also requires control of the transmitted power.

SUMMARY OF THE INVENTION

The present invention is mostly related to FDMA in that a wider frequency band is divided into a number of subbands with a modulated carrier wave in each subband. To vary the transmission speed, a user will be able to allocate as many subbands as he needs for covering his data clock requirement. It should also be possible to vary this allocation of subbands with time. Instead of having one transmitter/receiver in each subband, however, broadband transmitters/receivers are used which handle transmission over the entire accessible band.

Thus, the present invention provides a method for dynamic allocation of multiple carrier-wave channels where the bit stream or bits streams which will be transmitted are subjected to conversion from serial form to parallel form with a number of outputs, each parallel output is allocated a frequency band with a defined subcarrier wave, each sub-carrier wave is subjected to symbol coding by being modulated by the respective parallel bit stream in order to provide a number of parallel symbols or parallel subcarrier waves. The parallel symbols are converted by inverse discrete Fourier transform to a sequence in the time domain, which sequence is D/A-converted to provide a baseband signal. The baseband signal is RF-modulated with a frequency at the centre of the overall accessible frequency band. Thus, a single broadband transmitter handles the transmission of all channels. At the receiver end, the RF signal is demodulated to the baseband, the baseband signal is A/D-converted and the sample is frequency-demultiplexed by discrete Fourier transform which recreates the signal in frequency bands. Suitable frequency bands are selected taking into account the respective user and the signals in these frequency bands are symbol-decoded into parallel bit streams which are converted to serial form for recreating the original bit stream.

Frequency demultiplexing is advantageously carried out with oversampling in order to permit the best sampling time to be selected for the different frequency bands.

The invention also relates to transmitter and receiver arrangements for carrying out the method. The invention is specified in greater detail in the subsequent patent claims.

SHORT DESCRIPTION OF THE DRAWINGS

The invention will be described in detail below with reference to the attached drawings in which:

FIG. 1 is a diagram of how the accessible frequency band is divided up in accordance with the present invention, FIG. 2 is a block diagram of transmitters and receivers in the uplink in accordance with the invention, wherein the letters symbolize the following A: Serial to parallel conversion.
B: Symbol Coding
C: Frequency multiplexing with IDFT
D: D/A-conversion and filtering
E: RF-modulation
F: Information regarding adjustment of sampling points
G: Information regarding adjustment of carrier frequency and transmission effect
H: Serial to parallel conversion
I: Symbol coding
J: Frequency multiplexing with IDFT
K: D/A-conversion and filtering
L: RF-modulation
M: Information regarding adjustment and sampling time
N: Information regarding adjustment and transmission effect
O: Parallel to serial conversion
P: Parallel to serial conversion
Q: Symbol decoding with compensation for frequency faults
R: Down sampling
S: Frequency demultiplexing with DFT (with overlapping sampling)
T: A/D-conversion
U: RF-demodulation
V: Control logic
X: Back coupling of sampling times for the different subbands
Y: Back coupling of fault in time, frequency and signal strength for each mobile unit FIG. 3 is a block diagram like FIG. 2 for the downlink;

AA: Serial to parallel conversion
BB: Serial to parallel conversion
CC: Symbol coding
DD: Frequency multiplexing with IDFT
EE: D/A-conversion and filtering
FF: RF-modulation
GG: Parallel to serial conversion
HH: Symbol decoding
II: Frequency demultiplexing with DFT
JJ: A/D-conversion
KK: RF-demodulation
LL: Back coppling of sampling times
MM: Parallel to serial conversion
NN: Symbol decoding
OO: Frequency demultiplexing with DFT
PP: A/D-conversion
QQ: RF-demodulation
RR: Back coupling of sampling times

DETAILED DESCRIPTION OF PREFERRED EMBODIMENTS

Figure 1:
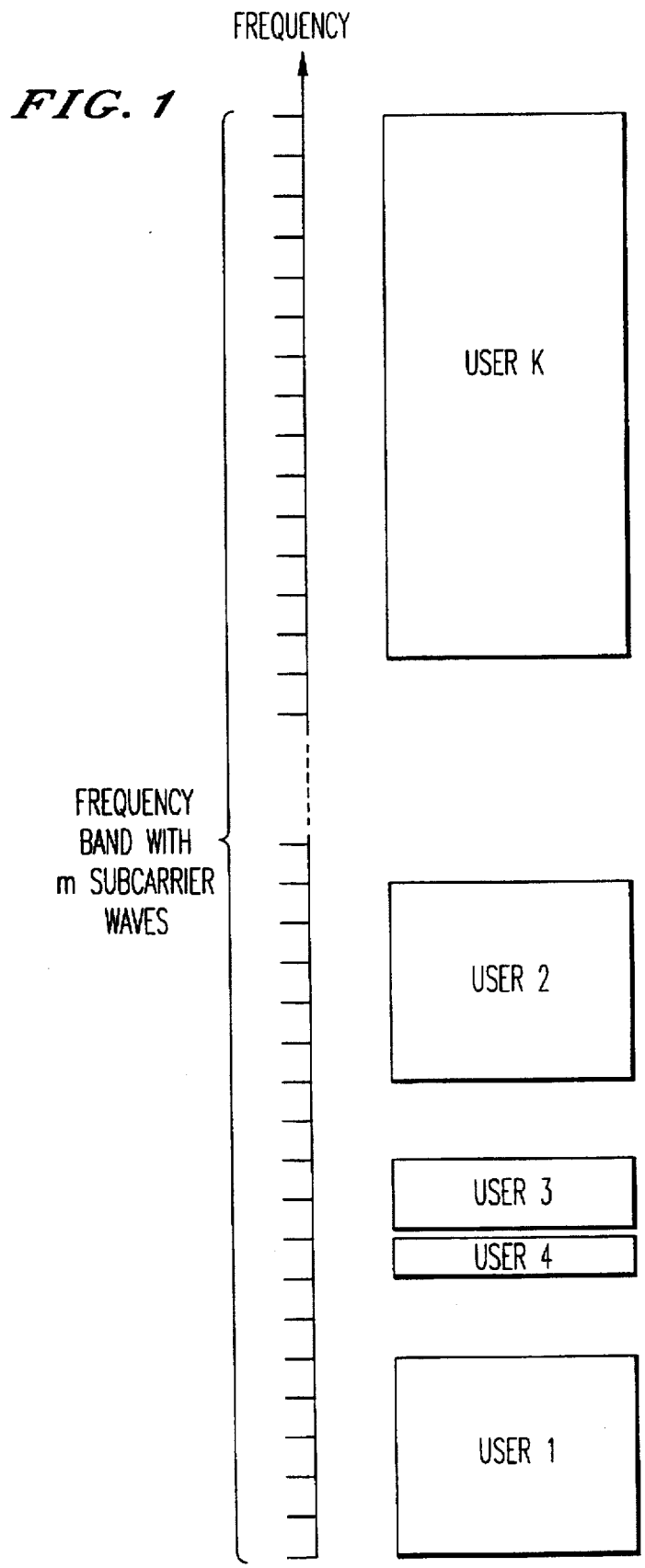

FIG. 1 shows the situation in, for example, a base station in a mobile telephone system. The base station is provided with a frequency band of, for example, 50 MHz. A number of users k will be served within the frequency band. The different users have different data clock requirements, partly between themselves and partly because their requirement varies with time. According to the invention, the total frequency band is divided into a number m, for example 50, of frequency bands with a subcarrier wave in each frequency band. Each user is allocated a suitable number of frequency bands. A number of known methods for dividing the frequency band are today available, which are used inter alia for allocating time gaps in a TDMA system. However, the different subcarrier waves are not transmitted by separate transmitters in this case but by a single broadband transmitter, as is explained below with reference to FIGS. 2 and 3.

Figure 2:
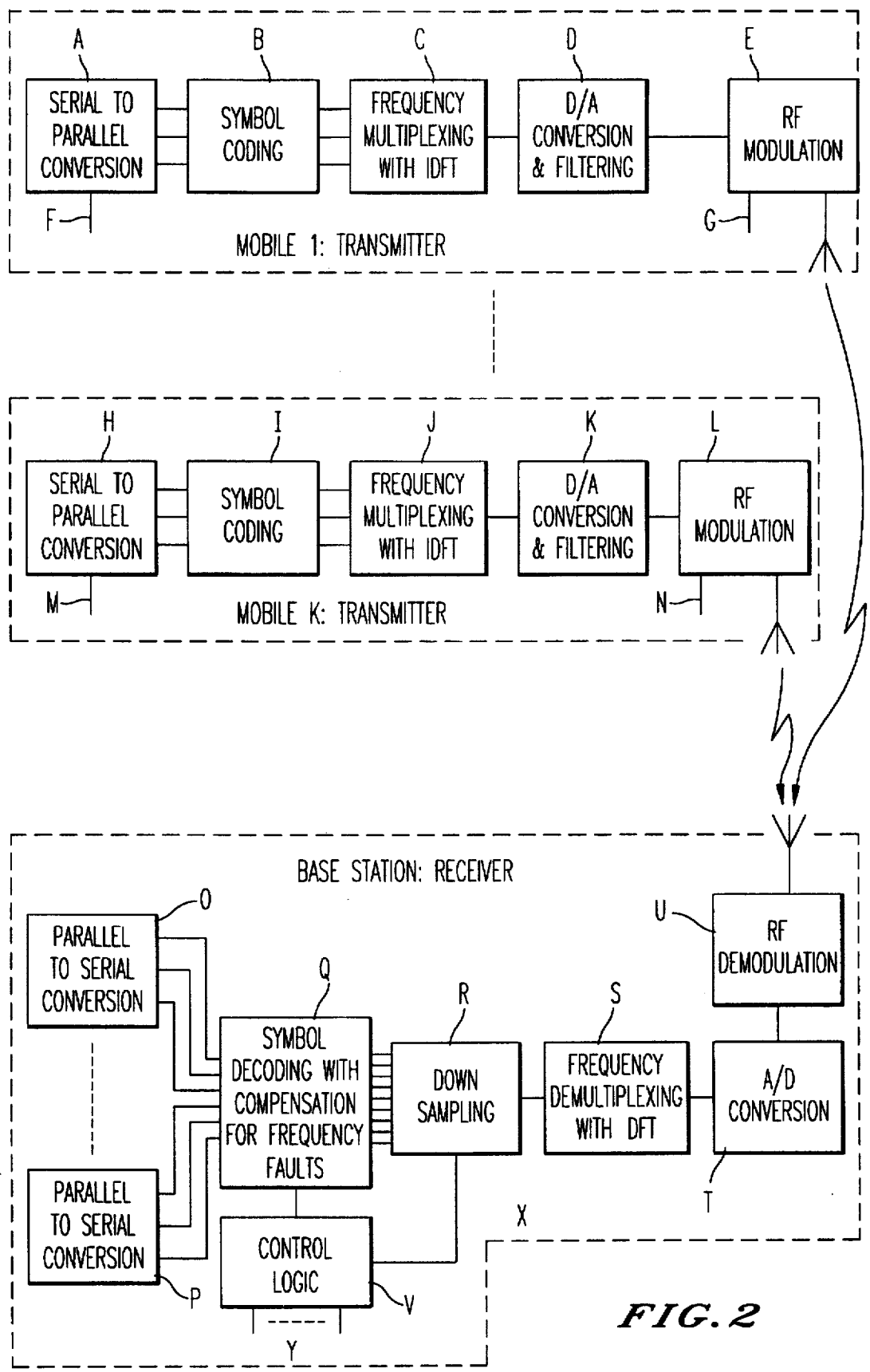

FIG. 2 shows the uplink situation, that is to say the mobiles transmit to the base station. Each mobile which wishes to transmit has a message in the form of a bit stream. Each frequency band has a fixed width of, for example, 1 MHz and thereby a limited data transmission speed. Allocation algorithms determine if the bit stream has space in one band or how many bands will be used. In general, a number of bands or subbands are required. The bit stream is therefore first subjected to serial to parallel conversion so that each band is given a suitable data speed. This can be carried out in a known manner, for example by means of a shift register.

In the unused subbands no power is transmitted.

The carrier waves in the subbands are then quadrature modulated with respective parallel bit streams, that is to say the subcarrier waves are subjected to symbol coding. Any suitable known modulation method can be used, for example BPSK, QPSK, QAM. The method has n bits/symbol and the modulation clocks 1 symbol/second (baud) which implies that the gross bit clock in each subband is n*1 bits/second. This provides a number of parallel symbols or wave forms, that is to say parallel modulated subcarrier waves. These parallel symbols are found in the frequency domain. In bands which will not be used a zero is applied.

These parallel symbols are obtained as a sequence in the time domain by an inverse discrete Fourier transform (IDEF) with m points. The sample sequence obtained is then further sampled by narrow-band filtering. It will be observed that, since the analog part of the transmitter only has broadband filtering, the filter must be of the band-pass type for minimizing transmitted power in non-allocated frequency gaps. Furthermore, the filter must be adaptive so that its band width can be changed when more or fewer frequency bands are allocated. The sequences are sampled the same number of times per symbol time as there are subcarrier waves.

The sequence is then subjected to D/A conversion. This provides a single time-continuous analog baseband signal which fills up the complete allocated frequency band.

The baseband signal can then be RF-modulated in a conventional manner at the centre frequency of the overall band, for example 900 MHz. The carrier wave frequency and output power can be adjusted at an RF modulator of the mobile in order to compensate for frequency error and to provide for power control for reasons which will be specified below.

In the receiver at the base station, first the received radio signal is converted to base band in the conventional manner by means of an RF demodulator. The baseband signal is A/D-converted.

To get back in the modulated subcarrier waves in the frequency domain, frequency demultiplexing is carried out by discrete Fourier transform (DFT) with m points. The choice of the "window" for this DFT determines the sampling times for the symbols in the subcarrier waves. This must be selected in such a manner that a maximum eye opening is obtained at the sampling time. Since the different mobiles are not synchronized to one another or at least only roughly synchronized, they will have different optimum sampling times. By carrying out frequency demultiplexing with oversampling, different sampling times can be selected independently of one another for the different mobiles. Oversampling is obtained by the DFT being taken via a multiple overlapping window. Oversampling can be, for example, 2, 4 or 8 times. The more accurately the mobiles can be synchronized, the lower the oversampling required. Higher oversampling makes higher demands on a fast Fourier transform.

After that, the sequence obtained is sampled down, which involves the best sample (the window) being selected for a respective frequency band. This is produced by feedback from the symbol decoding following. Higher layers report which frequencies belong to which user.

The symbol decoding is done in parallel for the different bands. Since receivers and transmitters are not synchronized, the right sampling time must be selected, hence the oversampling. The best point is selected as mentioned above.

To minimize interference between the signals received from different mobiles, the frequency error of the mobiles must also be kept within certain limits. Moreover, their output power must be adjusted so that all mobiles set the transmitted power level in such a manner that the received levels at the base stations become essentially identical. In the symbol decoding, errors in frequency and power are therefore measured which are fed back to the respective mobiles by the associated control logic. A number of known methods are available for this. Furthermore, errors in the sampling time are fed back to the unit which selects which sample will be used for the respective mobile.

This is followed by a parallel-to-serial conversion for the frequency bands which belong together. This recreates the original bit streams.

Figure 3:
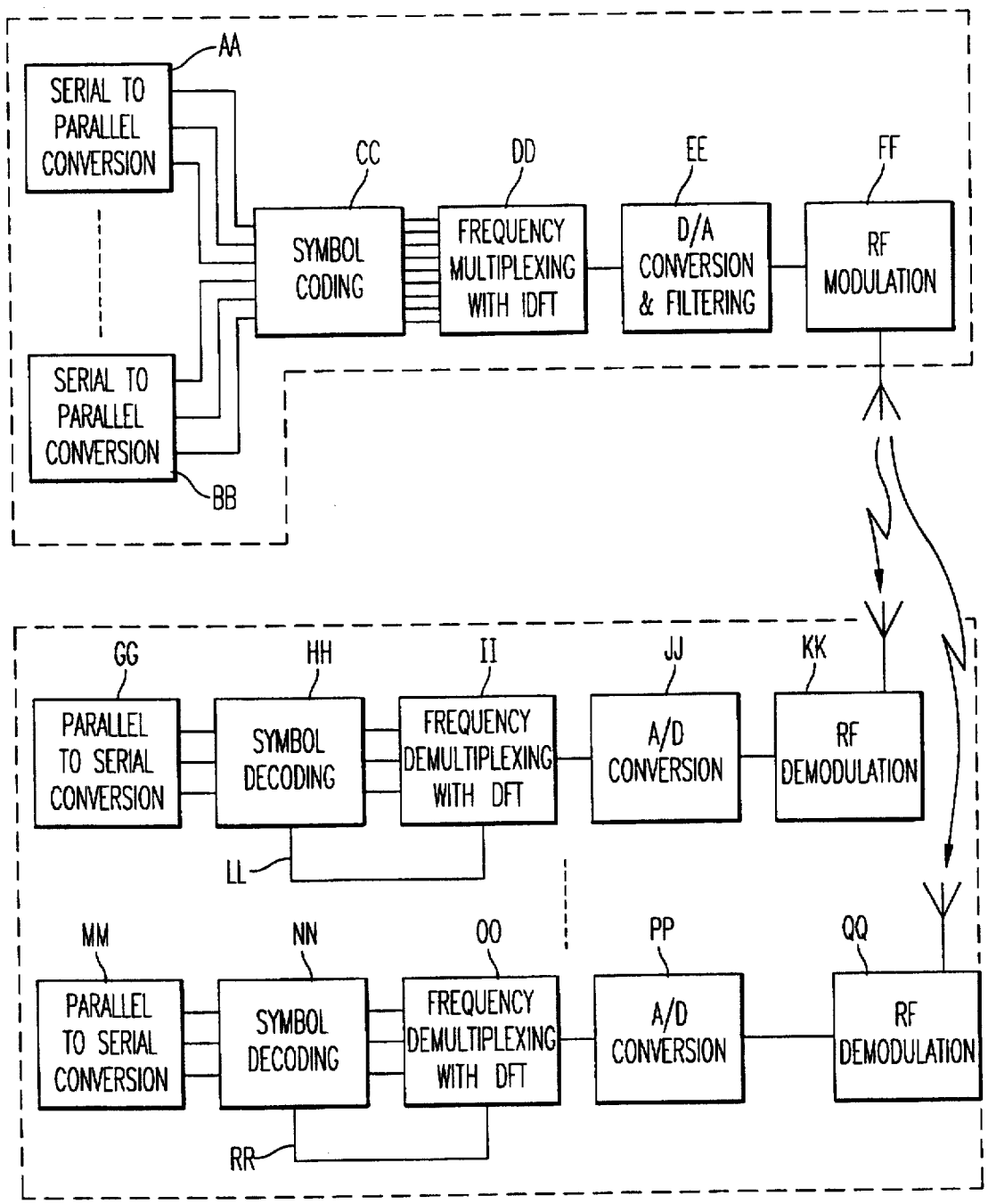

FIG. 3 shows the downlink configuration. The transmitter in the base station is mainly the same as the transmitters in the mobile stations. One difference is that the base station serves a number of users. Thus, serial-to-parallel conversion is carried out for each user. Higher layers handle the allocation of frequency bands. It is also assumed that the transmitter has a stable carrier wave frequency. There is a possibility of transmitting at different power in different frequency bands in order to adapt the power to the different receivers which are generally located at different distances from the base station.

The receivers in the mobile stations are simplified compared with the receivers in the base station. Since each mobile generally only receives signals from one base station, there is no problem with different synchronizations in the received signal. It is therefore not necessary to carry out oversampling in frequency demultiplexing in the mobile. Instead, the sampling time is selected on the basis of a feedback from the subsequent symbol decoder. The window can thereby be set to a suitable time which, of course, is the same for all frequency bands since they are transmitted from the same transmitter, namely the base station, and received at the one place in the mobile.

It must be pointed out that it is not necessary for there to be the same number of bands in the uplink and downlink. Asymmetric data traffic is thus possible, for example, with 10 kbit in one direction and 50 kbit in the other. The higher layer has access to a logic channel for signalling. Here, information about allocation of channels, type of transmission, synchronization etc. is exchanged, as is known in the field.

Thus, the present invention provides a novel system for the allocation of multiple carrier wave channels by frequency division multiplexing which utilizes Fourier transform and oversampling. An advantage of placing high data clocks in a number of parallel frequency bands is that the symbol clock becomes lower and with it the sensitivity to time dispersion. The protective scope of the invention is limited only by the patent claims following.

I claim:

1. A method for dynamic allocation of multiple carrier wave channels, comprising the following steps in the transmitter:

converting at least one bit stream from serial form to parallel form, a number of parallel outputs being obtained;

allocating dynamically each parallel output a frequency band with a defined subcarrier wave;

symbol coding each subcarrier wave with a respective parallel output, a number of parallel symbols being obtained;

transforming the parallel symbols by inverse discrete Fourier transform, a sequence in the time domain being obtained;

digital-to-analog converting the time domain sequence, a first time-continuous baseband signal being obtained;

RF-modulating the first time continuous baseband signal with a carrier wave frequency at a center of an overall accessible frequency band;

and comprising the following steps in the receiver:

demodulating the RF signal, a second time continuous baseband signal being obtained;

analog-to-digital converting the second time continuous baseband signal, a sampled baseband signal being obtained;

frequency-demultiplexing the sampled baseband signal by discrete Fourier transform, a division of the sampled baseband signal in frequency bands being obtained, selecting suitable frequency bands;

symbol-decoding signals in the selected frequency bands, a number of parallel bit streams being obtained; and converting the parallel bit streams to at least one serial bit stream in correspondence with the at least one original bit stream.

2. The method according to claim 1, wherein the step of symbol decoding further comprises the step of:

providing a feedback for adjusting a sampling time in the frequency demultiplexing step, the sampling time adjusted by adjusting a window size for the discrete Fourier transform.

3. The method according to claim 2, wherein the receiver receives signals from a number of transmitters, and the step of frequency demultiplexing further includes the step of:

oversampling the sampled baseband signal; and selecting a best sampling time for the respective frequency bands in response to the feedback from the symbol decoding step.

4. The method according to claim 3, wherein:

the step of symbol decoding further includes the step of providing information to the RF-modulating step; and the step of RF-modulating further includes the step of adjusting the carrier wave frequency and output power in response to the information provided by the symbol decoding step.

5. The method according to claim 2, wherein:

the step of symbol decoding further includes the step of providing information to the RF-modulating step; and the step of RF-modulating further includes the step of adjusting the carrier wave frequency and output power in response to the information provided by the symbol decoding step.

6. The method according to claim 1, wherein:

the step of symbol decoding further includes the step of providing information to the RF-modulating step; and the step of RF-modulating further includes the step of adjusting the carrier wave frequency and output power in response to the information provided by the symbol decoding step.

7. A transmitter arrangement with dynamic allocation of multiple carrier wave channels, comprising:

an arrangement for serial-to-parallel conversion of at least one bit stream per a number of parallel outputs;

an arrangement for dynamically allocating a frequency band with a defined subcarrier wave for each parallel output;

an arrangement for symbol coding of the subcarrier waves with respective parallel outputs;

an arrangement for frequency multiplexing of the symbol coded subcarrier waves by inverse discrete Fourier transform into a sequence in the time domain;

an arrangement for D/A conversion of the time domain sequence into a time-continuous baseband signal; and a modulation arrangement for RF modulation of the baseband signal with a carrier wave frequency at a center of an overall accessible frequency band.

8. The receiver according to claim 7, wherein the frequency demultiplexing arrangement carries out oversampling and the receiver arrangement further comprises a step-down sampling arrangement to which the symbol decoding arrangement provides feedback so that the step-down sampling arrangement can select a best sampling time for the respective frequency band.

9. A receiver arrangement for dynamic allocation of multiple carrier wave channels, comprising:
- a modulation arrangement for demodulating an RF signal with a carrier wave frequency at a center of an overall accessible frequency band to provide a baseband signal;
- an arrangement for A/D conversion of the baseband signal into a digital signal;
- an arrangement for frequency demultiplexing by discrete Fourier transform of the digital signal so that it is distributed to frequency bands;
- an arrangement for symbol decoding of signals in each frequency band into parallel bit streams; and
- an arrangement for parallel-to-serial conversion of selected bit streams of the parallel bit streams.

10. The receiver arrangement according to claim 9, wherein the symbol decoding arrangement provides feedback to the frequency demultiplexing arrangement for adjusting a sampling time, the sampling time adjusted by adjusting a window size for the discrete Fourier transform.

11. The receiver arrangement according to claim 10, wherein the frequency demultiplexing arrangement carries out oversampling and the receiver arrangement further comprises a step-down sampling arrangement to which the symbol decoding arrangement provides feedback so that the step-down sampling arrangement can select a best sampling time for the respective frequency band.

* * * * *